United States Patent
Tsai et al.

(10) Patent No.: US 9,484,978 B2
(45) Date of Patent: Nov. 1, 2016

(54) SYSTEM AND METHOD FOR COMMUNICATION WITH ADJUSTABLE SIGNAL PHASE AND POWER

(71) Applicant: HTC Corporation, Taoyuan (TW)

(72) Inventors: Tiao-Hsing Tsai, Taoyuan (TW);
Chien-Pin Chiu, Taoyuan (TW);
Wei-Yang Wu, Taoyuan (TW);
Hsiao-Wei Wu, Taoyuan (TW);
Chih-Chin Su, Taoyuan (TW);
Li-Yuan Fang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/668,539

(22) Filed: Mar. 25, 2015

(65) Prior Publication Data

US 2016/0285500 A1    Sep. 29, 2016

(51) Int. Cl.
*H04B 1/44*  (2006.01)
*H04M 1/00*  (2006.01)
*H04W 16/28*  (2009.01)

(52) U.S. Cl.
CPC .............. *H04B 1/44* (2013.01); *H04W 16/28* (2013.01)

(58) Field of Classification Search
CPC .................................................. H01Q 9/0442
USPC ................................................ 455/575.5, 73
See application file for complete search history.

(56) References Cited

U.S. PATENT DOCUMENTS

| | | | |
|---|---|---|---|
| 4,529,988 A * | 7/1985 | James | H01Q 3/26 342/379 |
| 5,107,273 A * | 4/1992 | Roberts | H01Q 3/2611 342/375 |
| 5,233,359 A | 8/1993 | Panaretos | |
| 6,731,920 B1 * | 5/2004 | Iwai | H01Q 1/243 343/702 |
| 7,937,051 B2 | 5/2011 | Väisänen | |
| 8,515,365 B2 | 8/2013 | Pan et al. | |
| 2004/0178862 A1 * | 9/2004 | Kaplan | H01Q 25/00 333/117 |

FOREIGN PATENT DOCUMENTS

| | | |
|---|---|---|
| TW | I306338 | 2/2009 |
| TW | I382693 | 1/2013 |
| TW | 201349788 | 12/2013 |
| TW | 201442339 A | 11/2014 |

* cited by examiner

*Primary Examiner* — Tilahun B Gesesse
(74) *Attorney, Agent, or Firm* — Birch, Stewart, Kolasch & Birch, LLP

(57) ABSTRACT

A communication system includes a first antenna, a second antenna, a first transceiver, a second transceiver, and a phase and power distribution transform circuit. The phase and power distribution transform circuit is coupled between the first antenna, the second antenna, the first transceiver, and the second transceiver. The phase and power distribution transform circuit is configured to adjust the phase and power of each signal from the first antenna, the second antenna, the first transceiver, and/or the second transceiver, thereby improving the communication quality of the communication system.

21 Claims, 9 Drawing Sheets

SYSTEM AND METHOD FOR COMMUNICATION WITH ADJUSTABLE SIGNAL PHASE AND POWER

BACKGROUND OF THE INVENTION

1. Field of the Invention

The subject application generally relates to a communication system, and more specifically, to a communication system with high communication quality.

2. Description of the Related Art

With the advancement of mobile communication technology, mobile devices such as portable computers, mobile phones, multimedia players, and other hybrid functional portable electronic devices have become more common. To satisfy the demand of users, mobile devices usually can perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2600 MHz. Some devices cover a small wireless communication area; these include mobile phones using Wi-Fi and Bluetooth systems and using frequency bands of 2.4 GHz, 5.2 GHz, and 5.8 GHz.

A current mobile device usually includes multiple antennas and transceivers for good communication quality and multiband operations. While the wireless communication function is performed, the mobile device can dynamically select one antenna which has the best communication quality to the relative base station. However, a conventional multi-antenna system is limited to the antenna structure and the device size, and it may have low radiation diversity, such that the communication quality may tend to be affected by the environment.

"Package correlation coefficient" is one of the evaluation indexes for signal diversity. If the package correlation coefficient is too high, it may represent that the radiation diversity between antennas is insufficient, and the multi-antenna system cannot provide the best communication quality. A conventional multi-antenna system often faces the problem of having a high package correlation coefficient. Accordingly, there is a need to design a new communication system for solving this problem in the prior art.

BRIEF SUMMARY OF THE INVENTION

In a preferred embodiment, the subject application is directed to a communication system including a first antenna, a second antenna, a first transceiver, a second transceiver, and a phase and power distribution transform circuit. The phase and power distribution transform circuit is coupled between the first antenna, the second antenna, the first transceiver, and the second transceiver. The phase and power distribution transform circuit is configured to adjust the phase and power of each signal from the first antenna, the second antenna, the first transceiver, and/or the second transceiver, thereby improving the communication quality of the communication system.

In some embodiments, the phase and power distribution transform circuit includes a first coupler, a second coupler, a third coupler, and a fourth coupler for combining or dividing signals.

In some embodiments, the first coupler has a first terminal coupled to the first antenna, a second terminal, and a third terminal. The second coupler has a first terminal coupled to the second antenna, a second terminal, and a third terminal.

In some embodiments, the third coupler has a first terminal coupled to the first transceiver, a second terminal coupled to the second terminal of the first coupler, and a third terminal coupled to the third terminal of the second coupler. The fourth coupler has a first terminal coupled to the second transceiver, a second terminal coupled to the third terminal of the first coupler, and a third terminal coupled to the second terminal of the second coupler.

In some embodiments, the phase and power distribution transform circuit further includes a first phase tuner and a second phase tuner for adjusting signal phase.

In some embodiments, the first phase tuner has a first terminal coupled to the third terminal of the first coupler, and a second terminal coupled to the second terminal of the fourth coupler. The second phase tuner has a first terminal coupled to the third terminal of the third coupler, and a second terminal coupled to the third terminal of the second coupler.

In some embodiments, when the communication system operates in a reception mode, the first coupler divides signals from the first antenna into a first signal and a second signal, the second coupler divides signals from the second antenna into a third signal and a fourth signal, the third coupler combines and transmits the first signal and the fourth signal to the first transceiver, and the fourth coupler combines and transmits the second signal and the third signal to the second transceiver.

In some embodiments, phase of the second signal is adjusted by the first phase tuner, and the phase of the fourth signal is adjusted by the second phase tuner.

In some embodiments, the phase and power distribution transform circuit controls radiation patterns of the first antenna and the second antenna to receive signals in different directions.

In some embodiments, the phase and power distribution transform circuit controls the first transceiver and the second transceiver to receive signals in different directions, so as to reduce the package correlation coefficient of each signal.

In some embodiments, when the communication system operates in a beam forming mode, none of the first signal, the second signal, the third signal, and the fourth signal has zero power.

In some embodiments, when the communication system operates in a first forward mode, neither of the first signal and the third signal has zero power, and each of the second signal and the fourth signal has zero power.

In some embodiments, when the communication system operates in a second forward mode, none of the first signal, the second signal, and the third signal has zero power, and the fourth signal has zero power.

In some embodiments, when the communication system operates in a third forward mode, none of the first signal, the third signal, and the fourth signal has zero power, and the second signal has zero power.

In some embodiments, when the communication system operates in a first swap mode, each of the first signal and the third signal has zero power, and neither of the second signal and the fourth signal has zero power.

In some embodiments, when the communication system operates in a second swap mode, none of the second signal, the third signal, and the fourth signal has zero power, and the first signal has zero power.

In some embodiments, when the communication system operates in a third swap mode, none of the first signal, the second signal, and the fourth signal has zero power, and the third signal has zero power.

In a preferred embodiment, the subject application is directed to a method for communication, including the steps of: providing a first antenna, a second antenna, a first transceiver, a second transceiver, and a phase and power distribution transform circuit, wherein the phase and power distribution transform circuit is coupled between the first antenna, the second antenna, the first transceiver, and the second transceiver; and using the phase and power distribution transform circuit to adjust the phase and power of each signal from the first antenna, the second antenna, the first transceiver, and/or the second transceiver, thereby improving communication quality.

BRIEF DESCRIPTION OF DRAWINGS

The subject application can be more fully understood by reading the subsequent detailed description and examples with references made to the accompanying drawings, wherein.

DETAILED DESCRIPTION OF THE INVENTION

In order to illustrate the purposes, features and advantages of the subject application, the embodiments and figures of the subject application are shown in detail as follows.

Figure 1:
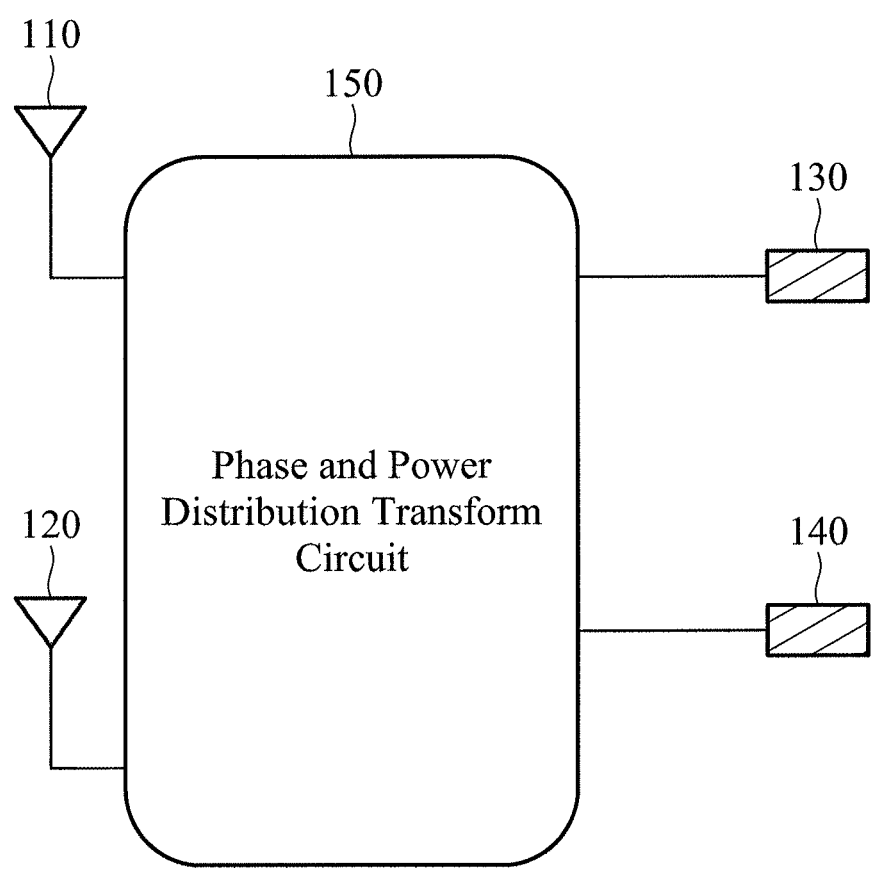
FIG. 1 is a diagram of a communication system according to an embodiment of the subject application.

FIG. 1 is a diagram of a communication system 100 according to an embodiment of the subject application. The communication system 100 may be applied in a mobile device, such as a smartphone, a tablet computer, or a notebook computer. As shown in FIG. 1, the communication system 100 at least includes a first antenna 110, a second antenna 120, a first transceiver 130, a second transceiver 140, and a phase and power distribution transform circuit 150. The types of the first antenna 110 and the second antenna 120 are not limited in the subject application. For example, any one of the first antenna 110 and the second antenna 120 may be a monopole antenna, a dipole antenna, a loop antenna, a helical antenna, a patch antenna, or a chip antenna. Both the first transceiver 130 and the second transceiver 140 have the functions of signal transmission and reception. Although there are only two antennas and two transceivers displayed in FIG. 1, the communication system 100 may include more antennas and more transceivers in other embodiments. The phase and power distribution transform circuit 150 is coupled between the first antenna 110, the second antenna 120, the first transceiver 130, and the second transceiver 140. The phase and power distribution transform circuit 150 is configured to adjust the phase and power of each signal from the first antenna 110, the second antenna 120, the first transceiver 130, and/or the second transceiver 140, thereby improving the communication quality of the communication system 100. The inner structure and operation of the phase and power distribution transform circuit 150 will be described in detail in the following embodiments. It should be understood that the following embodiments and figures are just exemplary, rather than limitations of the subject application.

Figure 2:
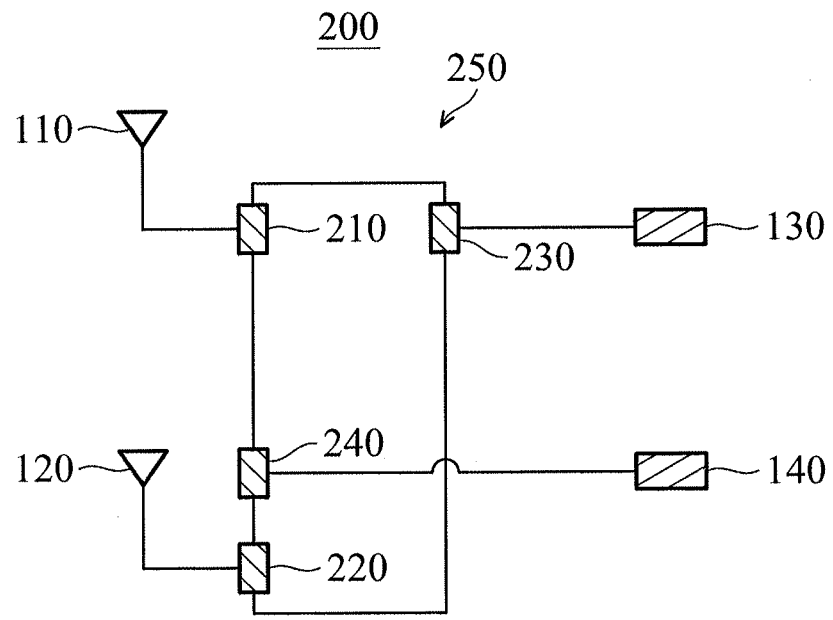
FIG. 2 is a diagram of a communication system according to an embodiment of the subject application.

FIG. 2 is a diagram of a communication system 200 according to an embodiment of the subject application. FIG. 2 is similar to FIG. 1. In the embodiment of FIG. 2, a phase and power distribution transform circuit 250 of the communication device 200 at least includes a first coupler 210, a second coupler 220, a third coupler 230, and a fourth coupler 240. Each coupler is arranged for combining or dividing signals. For example, each coupler may be a three-port element. The three-port element can divide one signal from its first terminal into two signals, and output the two signals through its second terminal and third terminal. Alternatively, the three-port element can combine two signals from its second terminal and third terminal into one signal, and output the combined signal through its first terminal. Specifically, the above couplers may be arranged as follows. The first coupler 210 has a first terminal coupled to the first antenna 110, a second terminal, and a third terminal. The second coupler 220 has a first terminal coupled to the second antenna 120, a second terminal, and a third terminal. The third coupler 230 has a first terminal coupled to the first transceiver 130, a second terminal coupled to the second terminal of the first coupler 210, and a third terminal coupled to the third terminal of the second coupler 220. The fourth coupler 240 has a first terminal coupled to the second transceiver 140, a second terminal coupled to the third terminal of the first coupler 210, and a third terminal coupled to the second terminal of the second coupler 220. The above operation of couplers, such as signal division, signal combination, signal pass, and adjustment of power ratio of signal division and signal combination, may be determined according to a control signal. The control signal may be generated by a processor, or may be input by a user (not shown). Furthermore, two corresponding switch elements may be respectively disposed at any two terminals of each coupler (not shown). The switching states of switch elements may be determined according to the control signal, and the switch elements for selectively blocking signals can enhance the performance of the subject application.

Figure 3:
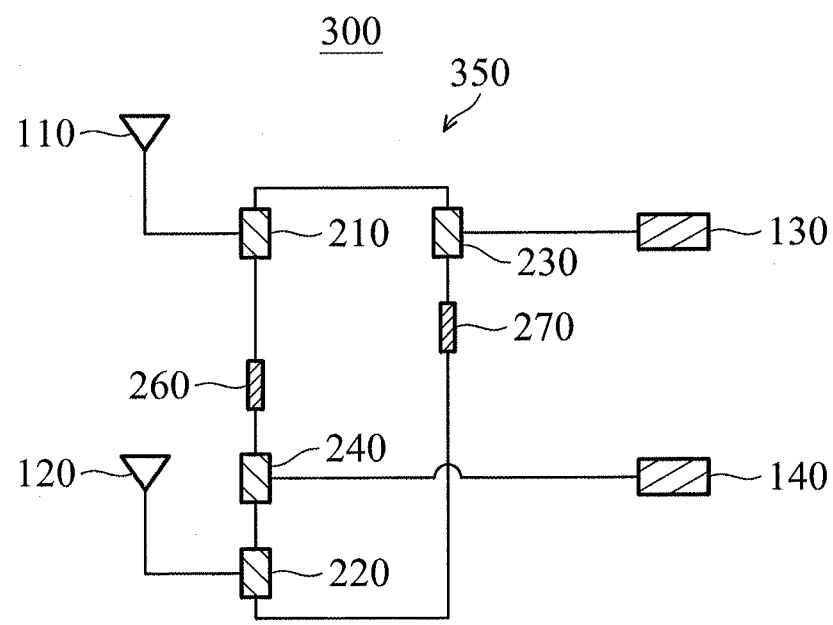
FIG. 3 is a diagram of a communication system according to an embodiment of the subject application.

FIG. 3 is a diagram of a communication system 300 according to an embodiment of the subject application. FIG.

3 is similar to FIG. 2. In the embodiment of FIG. 3, a phase and power distribution transform circuit 350 of the communication device 300 further includes a first phase tuner 260 and a second phase tuner 270. Each phase tuner is arranged for adjusting signal phase. For example, each phase tuner may be a two-port element. The two-port element can adjust the phase of a signal from its first terminal, and output the signal through its second terminal. Alternatively, the two-port element can adjust the phase of a signal from its second terminal, and output the signal through its first terminal. Specifically, the phase tuners may be arranged as follows. The first phase tuner 260 has a first terminal coupled to the third terminal of the first coupler 210, and a second terminal coupled to the second terminal of the fourth coupler 240. The second phase tuner 270 has a first terminal coupled to the third terminal of the third coupler 230, and a second terminal coupled to the third terminal of the second coupler 220. The above operation of phase tuners, such as leading signal phase by 45 degrees, leading signal phase by 90 degrees, lagging signal phase by 45 degrees, and lagging signal phase by 90 degrees, can be determined according to a control signal. The control signal may be generated by a processor, or may be input by a user (not shown).

Figure 4A:
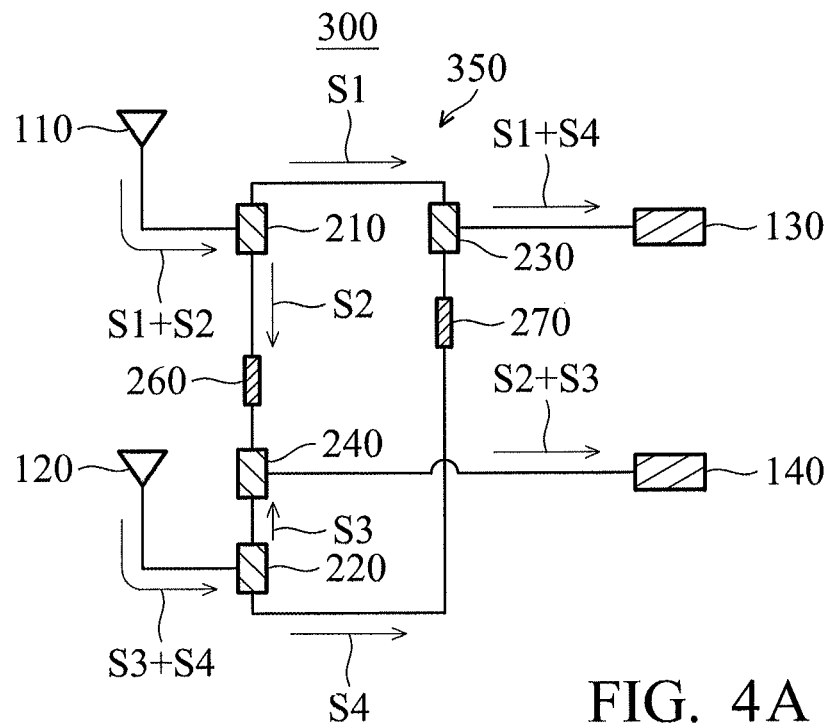
FIG. 4A is a diagram of a communication system according to an embodiment of the subject application.

FIG. 4A is a diagram of the communication system 300 according to an embodiment of the subject application. As shown in FIG. 4A, when the communication system 300 operates in a reception mode, the first coupler 210 divides signals from the first antenna 110 into a first signal S1 and a second signal S2, and the second coupler 220 divides signals from the second antenna 120 into a third signal S3 and a fourth signal S4. The power ratio of signal division is adjustable. For example, the power ratio of the first signal S1 to the second signal S2 may be 0.5:0.5 or 0.6:0.4 or 0.3:03. Alternatively, the power ratio of the first signal S1 to the second signal S2 may be 0:1 or 1:0 by appropriately using the switch elements disposed at two terminals of each coupler (not shown). For example, the power ratio of the third signal S3 to the fourth signal S4 may be 0.5:0.5 or 0.6:0.4 or 0.3:0.7. Alternatively, the power ratio of the third signal S3 to the fourth signal S4 may be 0:1 or 1:0 by appropriately using the switch elements disposed at two terminals of each coupler (not shown). The subject application is not limited to the above. The phase of the second signal S2 may be adjusted by the first phase tuner 260, and the phase of the fourth signal S4 may be adjusted by the second phase tuner 270. Then, the third coupler 230 combines the first signal S1 with the fourth signal S4 and transmits them to the first transceiver 130, and the fourth coupler 240 combines the second signal S2 with the third signal S3 and transmits them to the second transceiver 140. Generally, the communication system 300 initially divides two paths of signals (S1+S2 and S3+S4) received by the first antenna 110 and the second antenna 120, adjusts their signal phase, resynthesizes two different paths of signals (S1+S4 and S2+S3), and finally transmits these resynthesized signals to the first transceiver 130 and the second transceiver 140 for further processing. Such a design is like using two new antennas, which have different radiation characteristics from the original two antennas, to receive signals, thereby reducing the package correlation coefficient of each signal, and enhancing the radiation efficiency of the whole system. In addition, by appropriately controlling each coupler, the communication system 300 can freely select among multiple signal paths, so as to improve the efficiency of signal computation and signal usage. It should be noted that the above reception mode may include a beam forming mode, a first forward mode, a second forward mode, a third forward mode, a first swap mode, a second swap mode, and a third swap mode. These sub-modes will be described in detail in the embodiments of FIGS. 4A-4G.

Figure 5A:
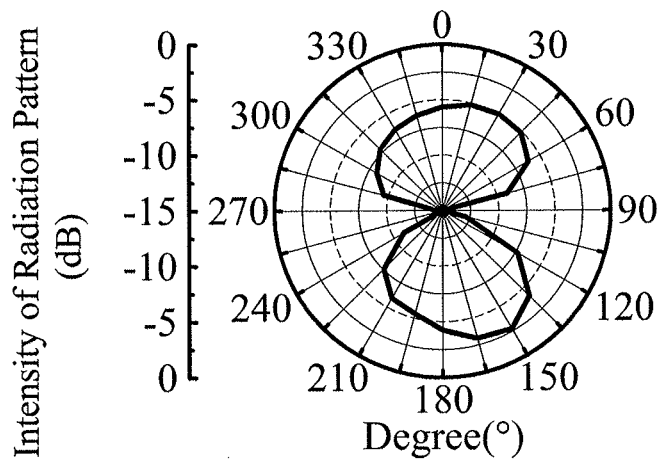
FIG. 5A is a total radiation pattern for a first antenna and a second antenna when the phase difference therebetween is 0 degrees according to an embodiment of the subject application.
Figure 5B:
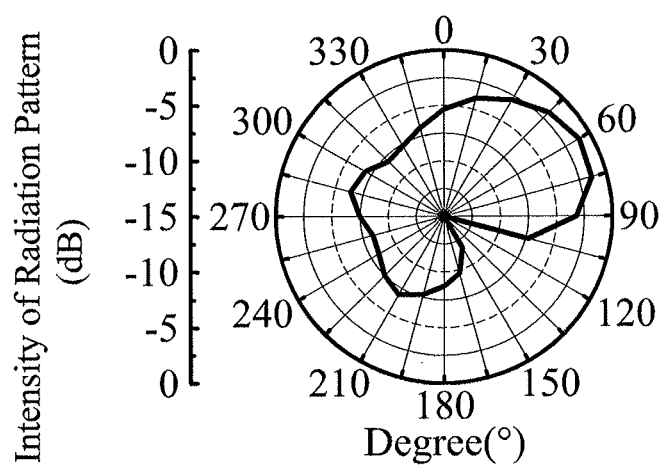
FIG. 5B is a total radiation pattern for a first antenna and a second antenna when the phase difference therebetween is 45 degrees according to an embodiment of the subject application.
Figure 5C:
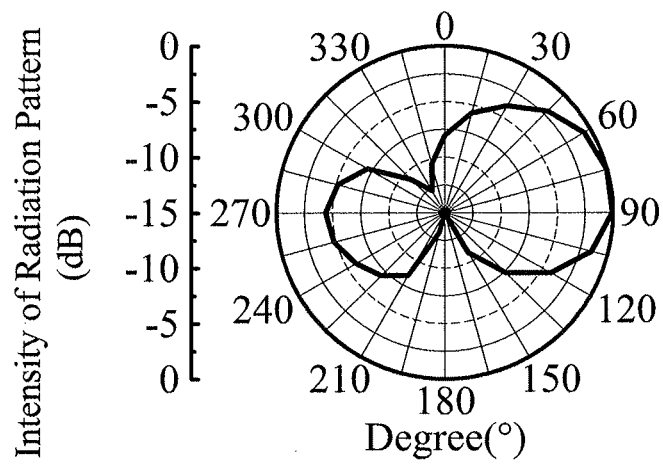
FIG. 5C is a total radiation pattern for a first antenna and a second antenna when the phase difference therebetween is 90 degrees according to an embodiment of the subject application.

In the embodiment of 4A, when the communication system 300 operates in the beam forming mode, none of the first signal S1, the second signal S2, the third signal S3, and the fourth signal S4 has zero power. In the beam forming mode, the phase and power distribution transform circuit 350 controls the radiation patterns of the first antenna 110 and the second antenna 120 to receive signals in different directions. Please refer to FIG. 5A, FIG. 5B, and FIG. 5C together. FIG. 5A is the total radiation pattern of the first antenna 110 and the second antenna 120 when the phase difference therebetween is 0 degrees according to an embodiment of the subject application. FIG. 5B is the total radiation pattern of the first antenna 110 and the second antenna 120 when the phase difference therebetween is 45 degrees according to an embodiment of the subject application. FIG. 5C is the total radiation pattern of the first antenna 110 and the second antenna 120 when the phase difference therebetween is 90 degrees according to an embodiment of the subject application. According to the measurement of FIG. 5A, FIG. 5B, and FIG. 5C, the total radiation pattern of the antenna system is adjustable by merely controlling the phase difference between the first antenna 110 and the second antenna 120, and therefore the antenna system is capable of receiving signals in different directions. In addition, if each coupler is further appropriately controlled to reduce the package correlation coefficient of each signal, the total radiation efficiency of the communication system 300 can be significantly enhanced, thereby improving the communication quality of the whole system.

Figure 4B:
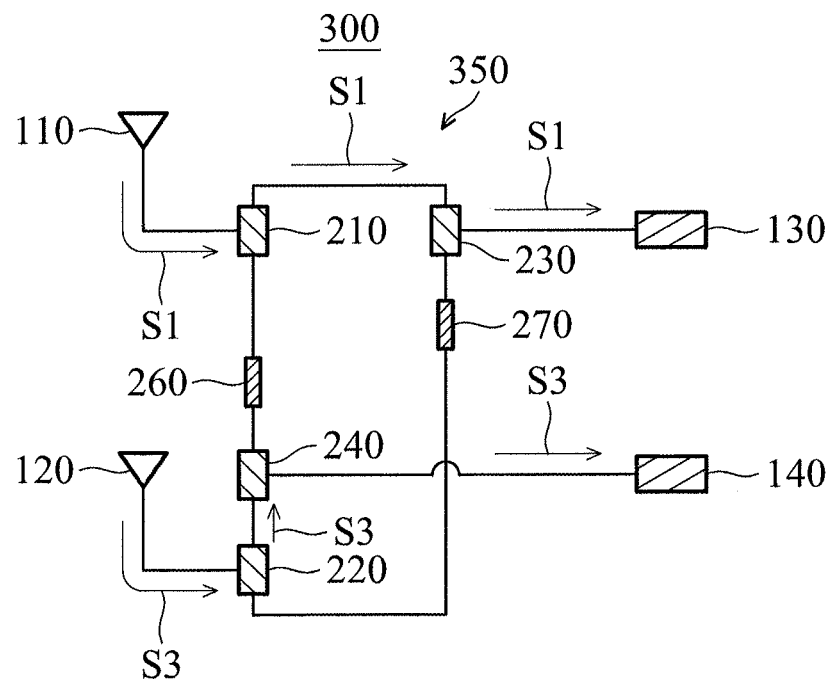
FIG. 4B is a diagram of a communication system according to an embodiment of the subject application.

FIG. 4B is a diagram of the communication system 300 according to an embodiment of the subject application. In the embodiment of FIG. 4B, when the communication system 300 operates in the first forward mode, neither of the first signal S1 and the third signal S3 has zero power, and each of the second signal S2 and the fourth signal S4 has zero power. In the first forward mode, the first signal S1 received by the first antenna 110 is directly transmitted to the first transceiver 130, and the third signal S3 received by the second antenna 120 is directly transmitted to the second transceiver 140. The first forward mode has no signal combination and no signal division, and it may be considered as a simple signal relay operation. For such a mode, the first antenna 110 merely communicates with the first transceiver 130, and the second antenna 120 merely communicates with the second transceiver 140.

Figure 4C:
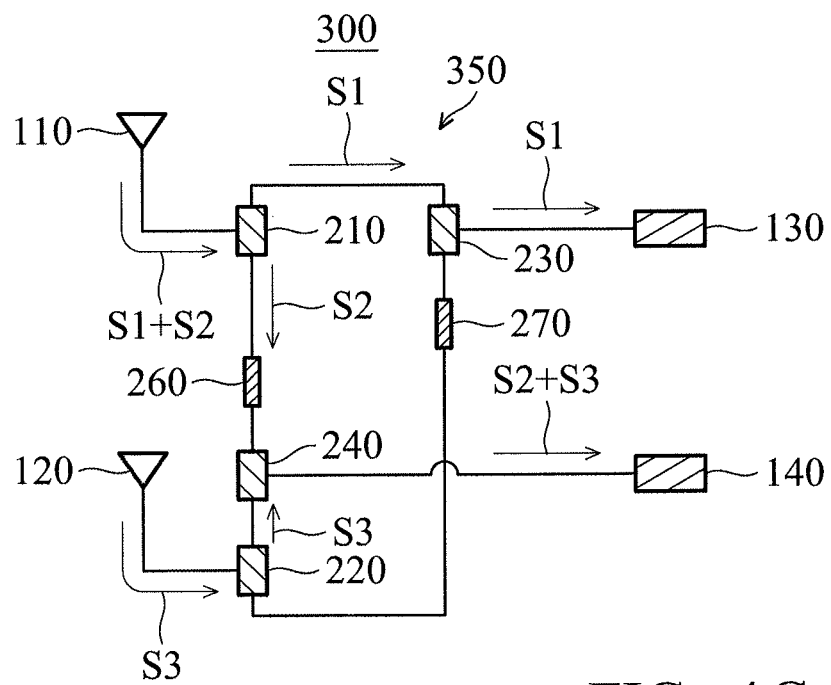
FIG. 4C is a diagram of a communication system according to an embodiment of the subject application.

FIG. 4C is a diagram of the communication system 300 according to an embodiment of the subject application. In the embodiment of FIG. 4C, when the communication system 300 operates in the second forward mode, none of the first signal S1, the second signal S2, and the third signal S3 has zero power, and the fourth signal S4 has zero power. In the second forward mode, the first signal S1 and the second signal S2 received by the first antenna 110 are initially divided. The first signal S1 is transmitted to the first transceiver 130. The second signal S2 is combined with the third signal S3 received by the second antenna 120, and the combined signal is transmitted to the second transceiver 140. For such a mode, both the first antenna 110 and the second antenna 120 communicate with the second transceiver 140, but only the first antenna 110 communicates with the first transceiver 130. It should be noted that the second forward mode can have the function of beam forming because the second signal S2 from the first antenna 110 is combined with the third signal S3 from the second antenna 120.

Figure 4D:
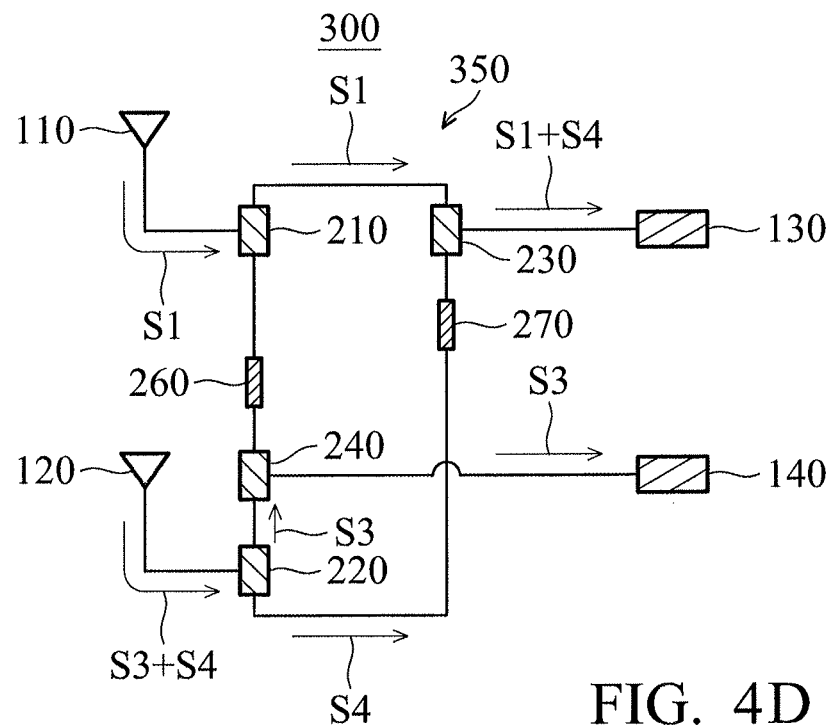
FIG. 4D is a diagram of a communication system according to an embodiment of the subject application.

FIG. 4D is a diagram of the communication system 300 according to an embodiment of the subject application. In the embodiment of FIG. 4D, when the communication system 300 operates in the third forward mode, none of the first signal S1, the third signal S3, and the fourth signal S4 has zero power, and the second signal S2 has zero power. In the third forward mode, the third signal S3 and the fourth signal S4 received by the second antenna 120 are initially divided. The third signal S3 is transmitted to the second transceiver 140. The fourth signal S4 is combined with the first signal S1 received by the first antenna 110, and the combined signal is transmitted to the first transceiver 130. For such a mode, both the first antenna 110 and the second antenna 120 communicate with the first transceiver 130, but only the second antenna 120 communicates with the second transceiver 140. Similarly, the third forward mode can have the function of beam forming because the first signal S1 from the first antenna 110 is combined with the fourth signal S4 from the second antenna 120.

Figure 4E:
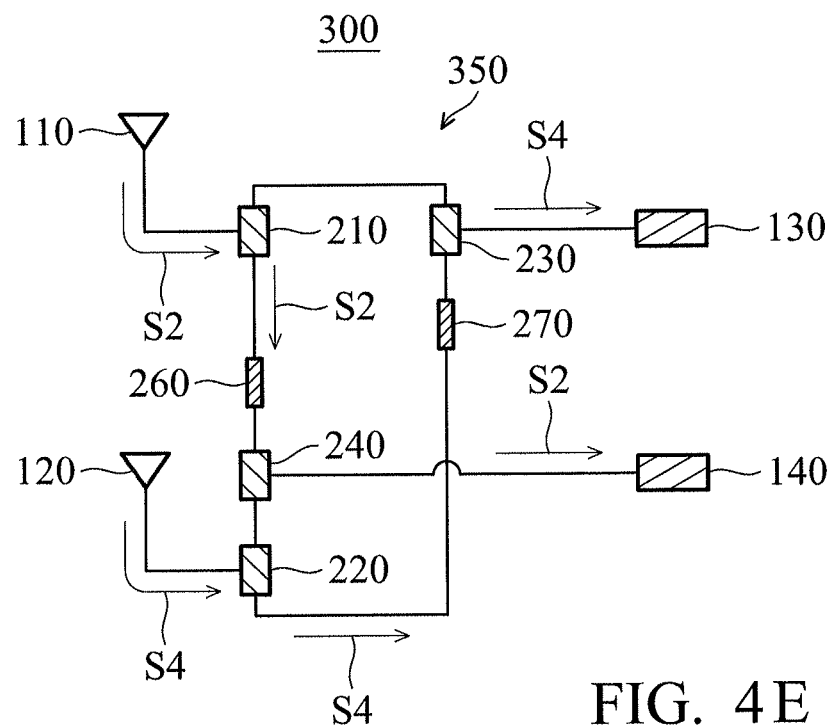
FIG. 4E is a diagram of a communication system according to an embodiment of the subject application.

FIG. 4E is a diagram of the communication system 300 according to an embodiment of the subject application. In the embodiment of FIG. 4E, when the communication system 300 operates in the first swap mode, each of the first signal S1 and the third signal S3 has zero power, and neither of the second signal S2 and the fourth signal S4 has zero power. In the first swap mode, the second signal S2 received by the first antenna 110 is directly transmitted to the second transceiver 140, and the fourth signal S4 received by the second antenna 120 is directly transmitted to the first transceiver 130. The first swap mode has no signal combination and no signal division, and it may be considered as a simple signal swap operation. For such a mode, the first antenna 110 merely communicates with the second transceiver 140, and the second antenna 120 merely communicates with the first transceiver 130.

Figure 4F:
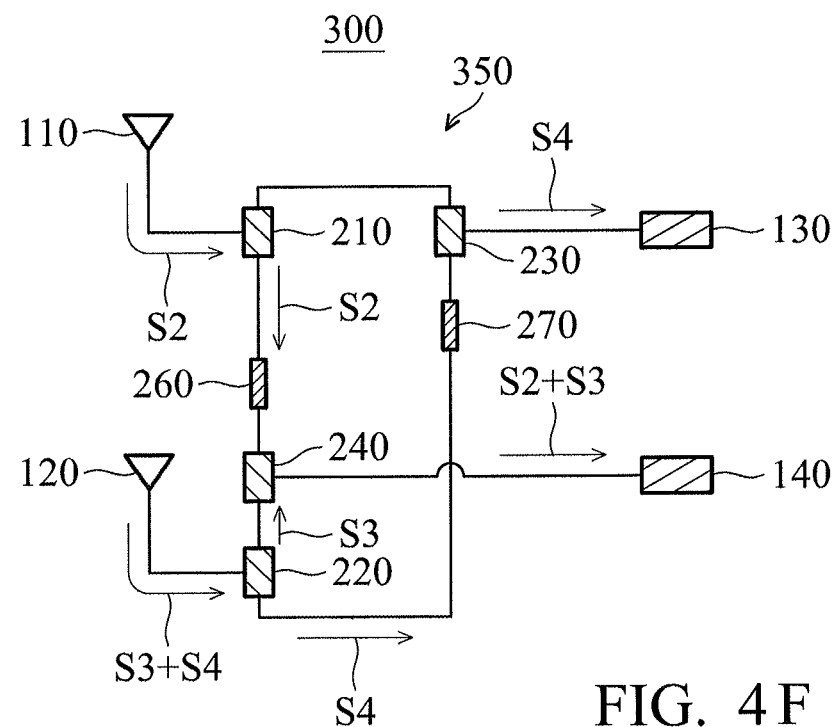
FIG. 4F is a diagram of a communication system according to an embodiment of the subject application.

FIG. 4F is a diagram of the communication system 300 according to an embodiment of the subject application. In the embodiment of FIG. 4F, when the communication system 300 operates in the second swap mode, none of the second signal S2, the third signal S3, and the fourth signal S4 has zero power, and the first signal S1 has zero power. In the second swap mode, the third signal S3 and the fourth signal S4 received by the second antenna 120 are initially divided. The fourth signal S4 is transmitted to the first transceiver 130. The third signal S3 is combined with the second signal S2 received by the first antenna 110, and the combined signal is transmitted to the second transceiver 140. For such a mode, both the first antenna 110 and the second antenna 120 communicate with the second transceiver 140, but only the second antenna 120 communicates with the first transceiver 130. Similarly, the second swap mode can have the function of beam forming because the second signal S2 from the first antenna 110 is combined with the third signal S3 from the second antenna 120.

Figure 4G:
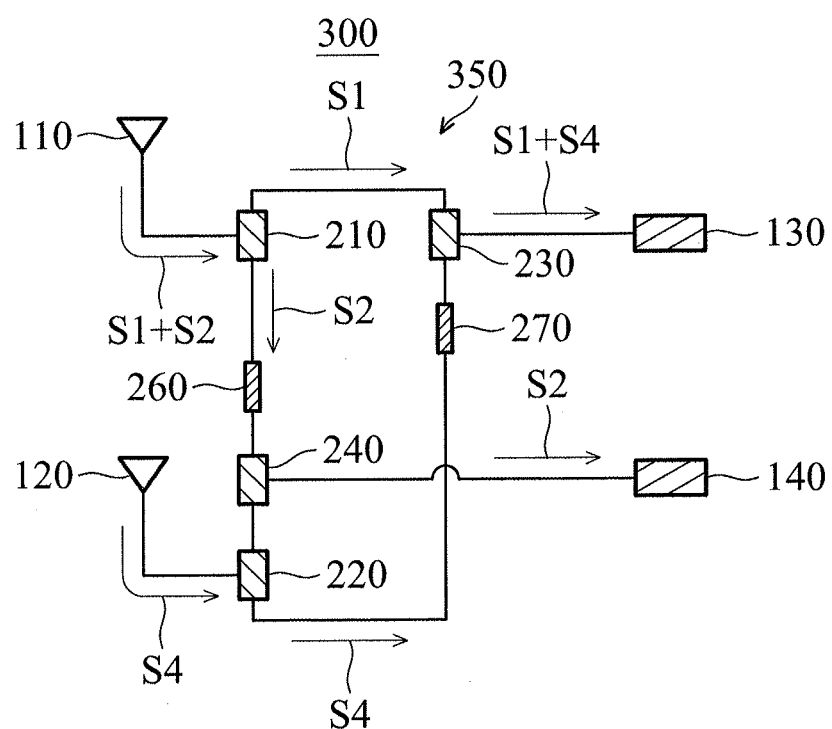
FIG. 4G is a diagram of a communication system according to an embodiment of the subject application.

FIG. 4G is a diagram of the communication system 300 according to an embodiment of the subject application. In the embodiment of FIG. 4G, when the communication system 300 operates in the third swap mode, none of the first signal S1, the second signal S2, and the fourth signal S4 has zero power, and the third signal S3 has zero power. In the third swap mode, the first signal S1 and the second signal S2 received by the first antenna 110 are initially divided. The second signal S2 is transmitted to the second transceiver 140. The first signal S1 is combined with the fourth signal S4 received by the second antenna 120, and the combined signal is transmitted to the first transceiver 130. For such a mode, both the first antenna 110 and the second antenna 120 communicate with the first transceiver 130, but only the first antenna 110 communicates with the second transceiver 140. Similarly, the third swap mode can have the function of beam forming because the first signal S1 from the first antenna 110 is combined with the fourth signal S4 from the second antenna 120.

It should be noted that the communication system 300 can also operate in a transmission mode. When the transmission system 300 operates in the transmission mode, its operation theory is substantially similar to that of the embodiments of FIGS. 4A-4G. The only difference is that its signal path is from the first transceiver 130 and the second transceiver 140 through the phase and power distribution transform circuit 350 to the first antenna 110 and the second antenna 120. For the transmission mode, the third coupler 230 and the fourth coupler 240 of the phase and power distribution transform circuit 350 are arranged for signal division, and the first coupler 210 and the second coupler 220 of the phase and power distribution transform circuit 350 are arranged for signal combination. Other features of the transmission mode are similar to those of the reception mode, and they will be not illustrated again here.

Figure 6:
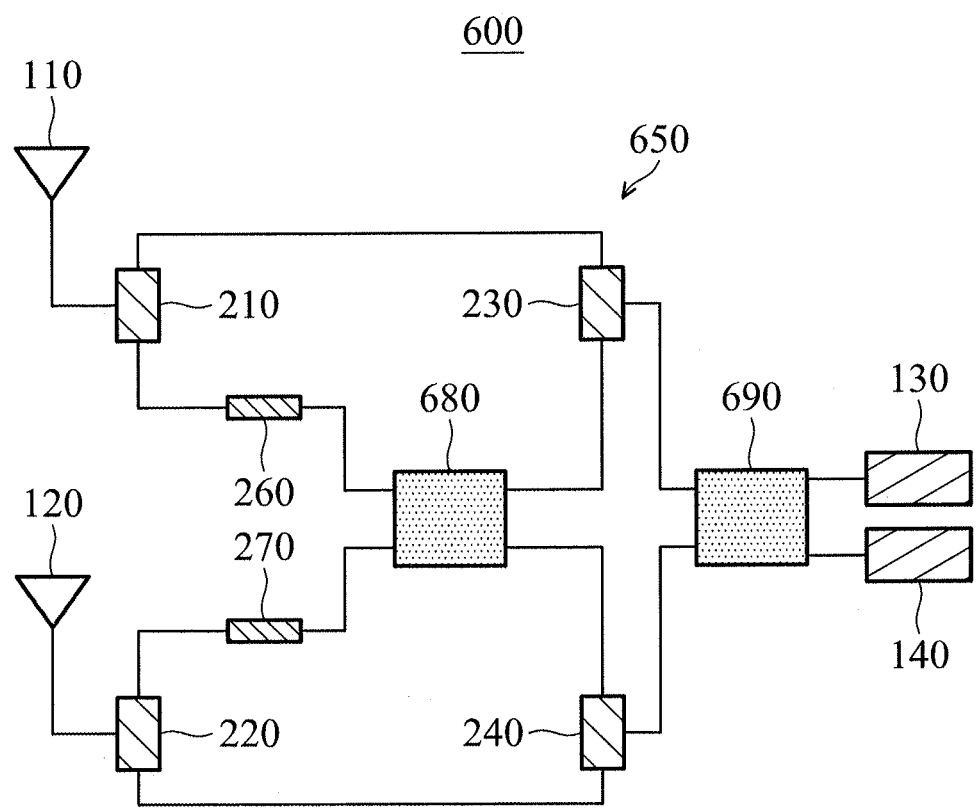
FIG. 6 is a diagram of a communication system according to an embodiment of the subject application.

FIG. 6 is a diagram of a communication system 600 according to an embodiment of the subject application. FIG. 6 is similar to FIG. 1. In the embodiment of FIG. 6, a phase and power distribution transform circuit 650 of the communication system 600 includes a first coupler 210, a second coupler 220, a third coupler 230, a fourth coupler 240, a first phase tuner 260, a second phase tuner 270, a first DPDT switch (Double-Pole and Double-Throw Switch) 680 and a second DPDT switch 690. The embodiment of FIG. 6 uses the first DPDT switch 680 and the second DPDT switch 690 to control each coupler, and it can achieve similar levels of performance to the embodiments of FIGS. 4A-4G.

Figure 7:
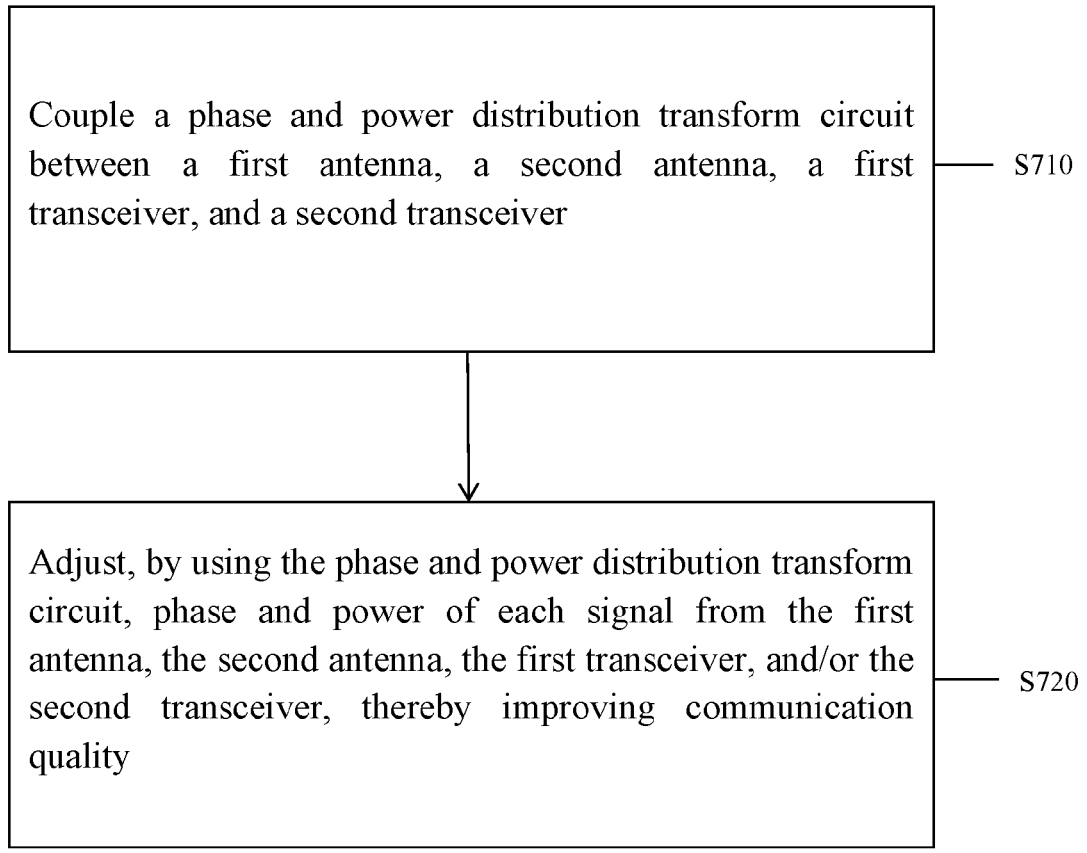
FIG. 7 is a flowchart of a communication method according to an embodiment of the subject application.

FIG. 7 is a flowchart of a communication method according to an embodiment of the subject application. The communication method includes the following steps. In step S710, a first antenna, a second antenna, a first transceiver, a second transceiver, and a phase and power distribution transform circuit are provided. The phase and power distribution transform circuit is coupled between the first antenna, the second antenna, the first transceiver, and the second transceiver. Then, in step S720, the phase and power distribution transform circuit is used to adjust the phase and power of each signal from the first antenna, the second antenna, the first transceiver, and/or the second transceiver, thereby improving the communication quality. It should be noted that the above steps are not required to be performed sequentially, and any one or more features of any one or more embodiments of FIGS. 1-6 may be applied to the method of FIG. 7.

The communication system and communication method of the subject application are not limited to the configurations of FIGS. 1-7. The subject application may merely include any one or more features of any one or more embodiments of FIGS. 1-7. In other words, not all of the features displayed in the figures should be implemented in the communication system and communication method of the subject application.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for the ordinal term) to distinguish the claim elements.

The embodiments of the disclosure are considered as exemplary only, not limitations. It will be apparent to those skilled in the art that various modifications and variations can be made in the subject application, the true scope of the disclosed embodiments being indicated by the following claims and their equivalents.

What is claimed is:

1. A communication system, comprising:
   a first antenna;
   a second antenna;
   a first transceiver;
   a second transceiver, wherein each of the first transceiver and the second transceiver is a combined element with functions of both signal transmission and reception; and
   a phase and power distribution transform circuit, coupled between the first antenna, the second antenna, the first transceiver, and the second transceiver;
   wherein the phase and power distribution transform circuit is configured to adjust phase and power of each signal from the first antenna, the second antenna, the first transceiver, and/or the second transceiver, thereby improving communication quality of the communication system,
   wherein the phase and power distribution transform circuit at least comprises a first coupler and a second coupler for combining or dividing signals,
   wherein the first coupler has a first terminal coupled to the first antenna, a second terminal, and a third terminal, and wherein the second coupler has a first terminal coupled to the second antenna, a second terminal, and a third terminal, and
   wherein the first coupler and the second coupler are both electrically connected to the first transceiver and the second transceiver.

2. The communication system as claimed in claim 1, wherein the phase and power distribution transform circuit further comprises a third coupler and a fourth coupler for combining or dividing signals.

3. The communication system as claimed in claim 2, wherein when the communication system operates in a reception mode, the first coupler divides signals from the first antenna into a first signal and a second signal, the second coupler divides signals from the second antenna into a third signal and a fourth signal, the third coupler combines and transmits the first signal and the fourth signal to the first transceiver, and the fourth coupler combines and transmits the second signal and the third signal to the second transceiver.

4. The communication system as claimed in claim 3, wherein phase of the second signal is adjusted by the first phase tuner, and phase of the fourth signal is adjusted by the second phase tuner.

5. The communication system as claimed in claim 3, wherein the phase and power distribution transform circuit controls radiation patterns of the first antenna and the second antenna to receive signals in different directions.

6. The communication system as claimed in claim 3, wherein the phase and power distribution transform circuit controls the first transceiver and the second transceiver to receive signals in different directions, so as to reduce a package correlation coefficient of each signal.

7. The communication system as claimed in claim 3, wherein when the communication system operates in a beam forming mode, none of the first signal, the second signal, the third signal, and the fourth signal has zero power.

8. The communication system as claimed in claim 3, wherein when the communication system operates in a first forward mode, neither of the first signal and the third signal has zero power, and each of the second signal and the fourth signal has zero power.

9. The communication system as claimed in claim 3, wherein when the communication system operates in a second forward mode, none of the first signal, the second signal, and the third signal has zero power, and the fourth signal has zero power.

10. The communication system as claimed in claim 3, wherein when the communication system operates in a third forward mode, none of the first signal, the third signal, and the fourth signal has zero power, and the second signal has zero power.

11. The communication system as claimed in claim 3, wherein when the communication system operates in a first swap mode, each of the first signal and the third signal has zero power, and neither of the second signal and the fourth signal has zero power.

12. The communication system as claimed in claim 3, wherein when the communication system operates in a second swap mode, none of the second signal, the third signal, and the fourth signal has zero power, and the first signal has zero power.

13. The communication system as claimed in claim 3, wherein when the communication system operates in a third swap mode, none of the first signal, the second signal, and the fourth signal has zero power, and the third signal has zero power.

14. The communication system as claimed in claim 1, wherein the third coupler has a first terminal coupled to the first transceiver, a second terminal coupled to the second terminal of the first coupler, and a third terminal coupled to the third terminal of the second coupler, and wherein the fourth coupler has a first terminal coupled to the second transceiver, a second terminal coupled to the third terminal of the first coupler, and a third terminal coupled to the second terminal of the second coupler.

15. The communication system as claimed in claim 14, wherein the phase and power distribution transform circuit further comprises a first phase tuner and a second phase tuner for adjusting signal phase.

16. The communication system as claimed in claim 15, wherein the first phase tuner has a first terminal coupled to the third terminal of the first coupler, and a second terminal coupled to the second terminal of the fourth coupler, and wherein the second phase tuner has a first terminal coupled to the third terminal of the third coupler, and a second terminal coupled to the third terminal of the second coupler.

17. The communication system as claimed in claim 1, wherein the phase and power distribution transform circuit further comprises a first DPDT switch (Double-Pole and Double-Throw Switch) and a second DPDT switch.

18. A method for communication, comprising the steps of:
   coupling a phase and power distribution transform circuit between a first antenna, a second antenna, a first transceiver, and a second transceiver, wherein each of the first transceiver and the second transceiver is a combined element with functions of both signal transmission and reception; and
   adjusting, by using the phase and power distribution transform circuit, phase and power of each signal from the first antenna, the second antenna, the first transceiver, and/or the second transceiver, thereby improving communication quality, wherein the phase and power distribution transform circuit at least comprises a first coupler and a second coupler for combining or dividing signals, wherein the first coupler has a first terminal coupled to the first antenna, a second terminal, and a third terminal, and wherein the second coupler has a first terminal coupled to the second antenna, a second terminal, and a third terminal, and wherein the first coupler and the second coupler are both electrically connected to the first transceiver and the second transceiver.

19. The method as claimed in claim 18, wherein the phase and power distribution transform circuit controls radiation patterns of the first antenna and the second antenna to receive signals in different directions.

20. The method as claimed in claim 18, wherein the phase and power distribution transform circuit controls the first transceiver and the second transceiver to receive signals in different directions, so as to reduce a package correlation coefficient of each signal.

21. The method as claimed in claim 18, wherein the phase and power distribution transform circuit further comprises a first DPDT switch (Double-Pole and Double-Throw Switch) and a second DPDT switch.

* * * * *